United States Patent
Lorenz et al.

(10) Patent No.: US 6,336,070 B1
(45) Date of Patent: Jan. 1, 2002

(54) APPARATUS AND METHOD FOR ENGINE CRANKSHAFT TORQUE RIPPLE CONTROL IN A HYBRID ELECTRIC VEHICLE

(75) Inventors: Robert Donald Lorenz, Madison, WI (US); Roy Inge Davis, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/516,618

(22) Filed: Mar. 1, 2000

(51) Int. Cl.[7] ............................ G01L 3/00; G01M 15/00
(52) U.S. Cl. ........................ 701/102; 701/110; 73/117.3
(58) Field of Search .................................. 701/102, 110, 701/114, 29, 35, 99; 180/197; 123/436, 406.23; 73/117.3

(56) References Cited

U.S. PATENT DOCUMENTS

| | | | |
|---|---|---|---|
| 4,691,288 A | 9/1987 | Kay et al. ................... 364/511 |
| 4,699,097 A | 10/1987 | Tanaka et al. ........... 123/192 R |
| 4,862,009 A | 8/1989 | King ............................ 290/22 |
| 4,922,869 A | 5/1990 | Kadomukai et al. .... 123/192 R |
| 4,977,508 A | 12/1990 | Tanaka et al. ......... 364/431.08 |
| 4,982,707 A | 1/1991 | Maeda et al. ........... 123/192 B |
| 5,020,491 A | 6/1991 | Mashino ................. 123/192 R |
| 5,033,425 A | 7/1991 | Kadomukai et al. .... 123/192 R |
| 5,056,487 A | 10/1991 | Yamakado et al. ......... 123/436 |
| 5,087,869 A | 2/1992 | Kuriyama et al. ............ 322/15 |
| 5,111,784 A | 5/1992 | Kuriyama et al. ........ 123/192.1 |
| 5,185,543 A | 2/1993 | Tebbe .......................... 310/51 |
| 5,186,136 A | 2/1993 | Kadomukai et al. ..... 123/192.1 |
| 5,537,967 A | 7/1996 | Tashiro et al. ........... 123/192.1 |
| 5,631,411 A | 5/1997 | Harms et al. ............... 73/117.3 |
| 5,666,917 A | 9/1997 | Fraser et al. ........... 123/339.11 |
| 5,678,460 A | 10/1997 | Malkowc ..................... 74/574 |
| 5,722,359 A | 3/1998 | Chubachi et al. ........ 123/192.2 |
| 5,730,094 A | 3/1998 | Morris ..................... 123/192.1 |
| 5,771,483 A | * 6/1998 | Moine et al. ................ 701/110 |
| 6,137,886 A | * 10/2000 | Shoureshi .................. 381/71.2 |

* cited by examiner

Primary Examiner—Henry C. Yuen
Assistant Examiner—Hieu T. Vo
(74) Attorney, Agent, or Firm—Karl A. Vick

(57) ABSTRACT

A control system comprising a processor develops data controlling a combustion engine and a dynamoelectric machine arranged to interact with the engine to modify the torque output of the engine. An observer (10) develops observed data that comprises estimated engine speed, estimated crankangle, and estimated engine output torque represented as an estimated average value torque component on which is superimposed an estimated alternating polarity ripple torque component whose mean value over a time interval of interest is substantially zero. The estimated alternating polarity ripple torque component is an input to a torque controller (102) for the dynamoelectric machine which causes the machine to contribute, in real time, torque that substantially cancels the alternating polarity ripple torque component in the crankshaft torque.

7 Claims, 2 Drawing Sheets

APPARATUS AND METHOD FOR ENGINE CRANKSHAFT TORQUE RIPPLE CONTROL IN A HYBRID ELECTRIC VEHICLE

REFERENCE TO A RELATED APPLICATION

Certain subject matter that is disclosed in the present application is the subject of the following commonly owned, co-pending patent application of the same inventors, OBSERVER FOR ENGINE CRANKSHAFT TORQUE, Ser. No. 09/502,700, filed Feb. 11, 2000.

BACKGROUND OF THE INVENTION

1. Field of the Invention

This invention relates generally to hybrid electric vehicles (HEV's), and more particularly to a control strategy for a hybrid electric vehicle of the type in which a dynamoelectric machine, such as a combination starter/alternator, interacts with a combustion engine that drives road-engaging wheels through a drivetrain.

2. Background Information

In one type of hybrid electric vehicle (HEV), a combustion engine is coupled through a drivetrain to road-engaging wheels, and a dynamoelectric machine, such as a combination starter/alternator, is arranged to interact with the engine to modify the torque output of the engine. Such a starter/alternator may be structurally integrated with a combustion engine. Although the drivetrain may be considered the primary load on the engine, various accessory loads, such as a power steering pump and a refrigerant compressor for example, may at times contribute to engine load.

During vehicle operation, the dynamoelectric machine may develop torque that is additive to the engine torque during certain conditions, thereby augmenting the torque output of the engine, while during other conditions, it may instead impose a torque load on the engine, diminishing the magnitude of torque that can be delivered by the engine. In other words, when it is adding to the engine torque, the dynamoelectric machine functions as an electric motor, and when it is subtracting from the engine torque, it functions as an alternator, or electric generator, that is being driven by the engine.

When functioning as an alternator powered by the engine, the rotating electric machine generates electricity that can be used for any appropriate purpose, such as charging an on-board energy storage means, an example of which is a storage battery or battery bank. When functioning as a motor, the rotating electric machine may draw electric current from the energy storage means to supplement the torque output of the engine.

From the foregoing brief and somewhat general description, it can be understood that various possible modes in which a rotating electric machine can interact with a combustion engine require a sophisticated control system and control strategy. The availability of high-speed electronic devices, such as processors, enables sophisticated control strategies to be implemented in real time.

Torque produced by an internal combustion engine contains an average value and typically a large ripple value. The ripple is due to a combination of interactive factors including combustion pressure pulses and kinematics of the engine slider crank mechanism. It is known to utilize various mechanical devices, such as flywheels and dampers for example, to attenuate ripple. The inclusion of such devices adds weight to an engine and increases cost. It is therefore desirable if ripple could be effectively attenuated in other ways, such as by an effective strategy for control of the interaction of a dynamoelectric machine with a combustion engine crankshaft.

An observer is a computational or numerical process that may be implemented in a digital microprocessor or in a digital signal processor. The observer acts on inputs supplied to it from various sources, such as sensors, to produce an estimate, or observation, of a variable of interest that, for any of various reasons such as cost or convenience of access, may be poorly suited for direct measurement. As such, observers are useful in multi-variable control systems as alternatives to direct measurement of at least some of the variables of interest. A closed-loop observer in which an observer feedback signal is compared to a measured quantity in order to force the other estimated quantities to converge to their actual, correct values, may provide a higher degree of performance than one that is not closed-loop.

Torque of a rotating shaft is one variable that may be considered relatively difficult to accurately measure, even in laboratory conditions. Hence it is believed to be well suited for estimation by an observer. Moreover, torque observation may eliminate the need for a devoted torque sensor, thereby improving robustness of a multi-variable system.

In an automotive vehicle, observation of the torque output of an internal combustion engine crankshaft would be useful in the performance of various control functions related to vehicle powertrain operation, including for example engine control, transmission shift control, combustion diagnostics, and dynamometer testing. In a hybrid electric vehicle that has a starter/alternator associated with the engine, the electric machine can develop torque that can be independently controlled to interact with engine crankshaft torque in beneficial ways including: reduction of the ripple content of crankshaft torque, boosting transient crankshaft torque during vehicle launch and acceleration, recapturing breaking energy during vehicle decelerations, and retarding or boosting crankshaft torque for faster engine speed slewing during controlled shifting. Accurate observation of crankshaft torque in real time would be advantageous in controlling starter/alternator torque so as to secure its desired interaction with crankshaft torque in real time. Active control of the electric machine may enable it to function in a manner equivalent to a mechanical flywheel, and hence a starter/alternator that is controlled in this manner may sometimes be referred to as an active flywheel. An active flywheel may function to produce a zero mean value, destructively interfering torque that, when superimposed on the crankshaft torque, tends to reduce or eliminate ripple in the crankshaft torque caused by periodic combustion events in the engine cylinders.

In order to command the starter/alternator to produce correct torque for smoothing the ripple, precise instantaneous measurement of crankshaft torque during combustion events is needed. A crankshaft torque observer possessing this capability could be made an integral part of an overall fuel economy strategy for lowering engine idle speed while improving NVH (noise, vibration, harshness).

The co-pending patent application referenced above discloses a crankshaft torque observer that is useful in practice of the present invention.

SUMMARY OF THE INVENTION

The present invention relates to improvements in HEV control strategy implementation, particularly in an HEV of the type described above where a dynamoelectric machine is arranged for interaction with a combustion engine so as to function, with respect to the engine, at times as a power source, i.e. as an electric motor, for adding torque into the drivetrain, and at times as a power sink, i.e. as an alternator, for replenishing the charge of an on-board storage battery. This type of HEV is representative of what is sometimes referred to as a low storage requirement HEV. Although a starter-alternator that has a point of interaction with the engine at the engine crankshaft is believed to be a configuration that provides most accurate attenuation of ripple torque, generic principles of the invention contemplate both points of interaction that are more remote and devices other than starter-alternators.

In accomplishing the best control strategy, it is believed that 1) the phase of the cancellation torque should align as closely as possible to the phase of the ripple torque, and 2) the cancellation torque should have zero average value so as to neither buck nor boost the average engine torque driving the load. Principles of the present invention: employ the referenced crankshaft torque observer to provide feedforward and state estimates for use in a state feedback controller; account for the effect of the dynamoelectric machine, i.e. starter-alternator; and extract substantially only the ripple component of observed crankshaft torque and use it as a principal component of an electric torque command.

One generic aspect of the present invention relates to a hybrid electric vehicle comprising a combustion engine for propelling the vehicle via a drivetrain of the vehicle and comprising a slider-crank mechanism including a rotating crankshaft that delivers output torque to a load and a dynamoelectric machine arranged for interaction with the combustion engine to modify the output torque delivered by the crankshaft.

A control system comprising a processor develops data controlling the combustion engine and the dynamoelectric machine and includes an observer for developing observed data that comprises estimated engine speed, estimated crankangle, and estimated engine output torque represented as an estimated average value torque component on which is superimposed an estimated alternating polarity ripple torque component whose mean value over a time interval of interest is substantially zero.

The observer comprises a combustion process model developing modeled pressure estimates of combustion chamber pressures in engine cylinders according to data that influences combustion chamber pressures, a kinematics model relating reciprocal motion of pistons in the engine cylinders to engine crankshaft rotation, an engine friction model relating running friction of the engine to engine crankshaft rotation, an observer closed loop controller to force convergence of estimated crankangle to measured crankangle, a filter model developing the estimated alternating polarity ripple torque component from the estimated engine output torque, a dynamoelectric machine model modeling the dynamoelectric machine, an engine load model modeling load on the engine crankshaft, and a moment of inertia model modeling moment of inertia of a slider-crank mechanism of the engine as a function of crankangle.

The processor operates to process data through the combustion process model to develop the modeled pressure estimates, to process estimated crankangle and the modeled pressure estimates through the kinematics model to develop estimated positive torque contribution due to combustion processes, to process the modeled pressure estimates, the estimated crankangle, and the estimated engine speed through the engine friction model to develop estimated torque loss due to engine running friction, and to process the estimated positive torque contribution due to combustion processes and the estimated torque loss due to engine running friction to develop the estimated engine torque output.

The processor further operates to process the measured crankangle and the estimated crankangle through the observer controller to develop crankangle convergence data, to process the estimated engine torque output and the crankangle convergence data through the filter model to develop the estimated alternating polarity ripple torque component, and to process the estimated alternating polarity ripple torque component through the dynamoelectric machine model to develop estimated dynamoelectric machine torque output, to subtract the estimated dynamoelectric machine torque output from the estimated engine torque output and process that difference and the convergence data through the moment of inertia model to develop the estimated crankangle and the estimated engine speed.

The processor further operates to process the estimated crankangle, the estimated engine speed, and the estimated alternating polarity ripple torque component to develop dynamoelectric machine torque data representing torque that the dynamoelectric machine is commanded to deliver for substantially canceling, from output torque delivered by the crankshaft, engine-induced ripple torque that has substantially zero mean value over a time interval of interest, resulting in crankshaft torque that has substantially zero mean value RMS dynamic content over a time interval of interest.

Another generic aspect relates to a control system for a powerplant that comprises a combustion engine having a slider-crank mechanism including a rotating crankshaft that delivers output torque and a dynamoelectric machine arranged for interaction with the combustion engine to modify the output torque delivered by the crankshaft.

The control system comprises a processor for developing data for controlling the combustion engine and the dynamoelectric machine, including an observer for developing observed data that comprises estimated engine speed, estimated crankangle, and estimated engine output torque represented as an estimated average value torque component on which is superimposed an estimated alternating polarity ripple torque component whose mean value over a time interval of interest is substantially zero.

The observer comprises a combustion process model developing modeled pressure estimates of combustion chamber pressures in engine cylinders according to data that influences combustion chamber pressures, a kinematics model relating reciprocal motion of pistons in the engine cylinders to engine crankshaft rotation, an engine friction model relating running friction of the engine to engine crankshaft rotation, an observer closed loop controller to force convergence of estimated crankangle to measured crankangle, a filter model developing the estimated alternating polarity ripple torque component from the estimated engine output torque, a dynamoelectric machine model modeling the dynamoelectric machine, an engine load model modeling load on the engine crankshaft, and a moment of inertia model modeling moment of inertia of a slider-crank mechanism of the engine as a function of crankangle.

The processor operates to process data through the combustion process model to develop the modeled pressure estimates, to process estimated crankangle and the modeled pressure estimates through the kinematics model to develop estimated positive torque contribution due to combustion processes, to process the modeled pressure estimates, the estimated crankangle, and the estimated engine speed through the engine friction model to develop estimated torque loss due to engine running friction, and to process the estimated positive torque contribution due to combustion processes and the estimated torque loss due to engine running friction to develop the estimated engine torque output.

The processor further operates to process the measured crankangle and the estimated crankangle through the observer closed loop controller to develop crankangle convergence data, to process the estimated engine torque output and the crankangle convergence data through the filter model to develop the estimated alternating polarity ripple torque component, and to process the alternating polarity ripple torque component through the dynamoelectric machine model to develop estimated dynamoelectric machine torque output, to subtract the estimated dynamoelectric machine torque output from the estimated engine torque output and process that difference and the convergence data through the moment of inertia model to develop the estimated crankangle and the estimated engine speed.

The processor further operates to process the estimated crankangle, the estimated engine speed, and the estimated alternating polarity ripple torque component to develop dynamoelectric machine torque data representing torque that the dynamoelectric machine is commanded to deliver for substantially canceling, from output torque delivered by the crankshaft, engine-induced ripple torque that has substantially zero mean value over a time interval of interest, resulting in crankshaft torque that has substantially zero mean value RMS dynamic content over a time interval of interest.

A further aspect of the invention relates to a method of controlling a dynamoelectric machine to substantially cancel substantially zero mean value ripple torque induced in a crankshaft of a combustion engine by combustion events that are effective on the crankshaft through a slider-crank mechanism.

The method comprises processing data through an observer to develop observed data that comprises estimated engine speed, estimated crankangle, and estimated engine output torque represented as an estimated average value torque component on which is superimposed an estimated alternating polarity ripple torque component whose mean value over a time interval of interest is substantially zero.

The method further comprises: processing data through a combustion process model in the observer to develop modeled pressure estimates of combustion chamber pressures in engine cylinders according to data that influences combustion chamber pressures, processing estimated crankangle and the modeled pressure estimates through a kinematics model in the observer relating reciprocal motion of pistons in the engine cylinders to engine crankshaft rotation to develop estimated positive torque contribution due to combustion processes; processing the modeled pressure estimates, the estimated crankangle, and estimated engine speed through an engine friction model in the observer relating running friction of the engine to engine crankshaft rotation to develop estimated torque loss due to engine running friction; processing, in the observer, the estimated positive torque contribution due to combustion processes and the estimated torque loss due to engine running friction to develop indicted engine torque output; processing the measured crankangle and the estimated crankangle through an observer closed loop controller forcing convergence of estimated crankangle to measured crankangle; processing the estimated engine torque output and the crankangle convergence data through a filter model in the observer to develop the estimated alternating polarity ripple torque component from the estimated engine output torque; processing the estimated alternating polarity ripple torque component through a dynamoelectric machine model in the observer modeling the dynamoelectric machine to develop estimated dynamoelectric machine torque output; and subtracting the estimated dynamoelectric machine torque output from the estimated engine torque output and processing that difference and the convergence data through an engine load model in the observer modeling load on the engine crankshaft and a moment of inertia model in the observer modeling moment of inertia of the slider-crank mechanism as a function of crankangle to develop the estimated crankangle and the estimated engine speed.

The method further comprises processing the estimated crankangle, the estimated engine speed, and the estimated alternating polarity ripple torque component to develop dynamoelectric machine torque data representing torque that the dynamoelectric machine is commanded to deliver for substantially canceling, from output torque delivered by the crankshaft, engine-induced ripple torque that has substantially zero mean value over a time interval of interest, resulting in crankshaft torque that has substantially zero mean value RMS dynamic content over a time interval of interest.

Further inventive aspects will be disclosed and perceived from a reading of the ensuing description and claims with reference to the accompanying drawing.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENTS

Figure 1:
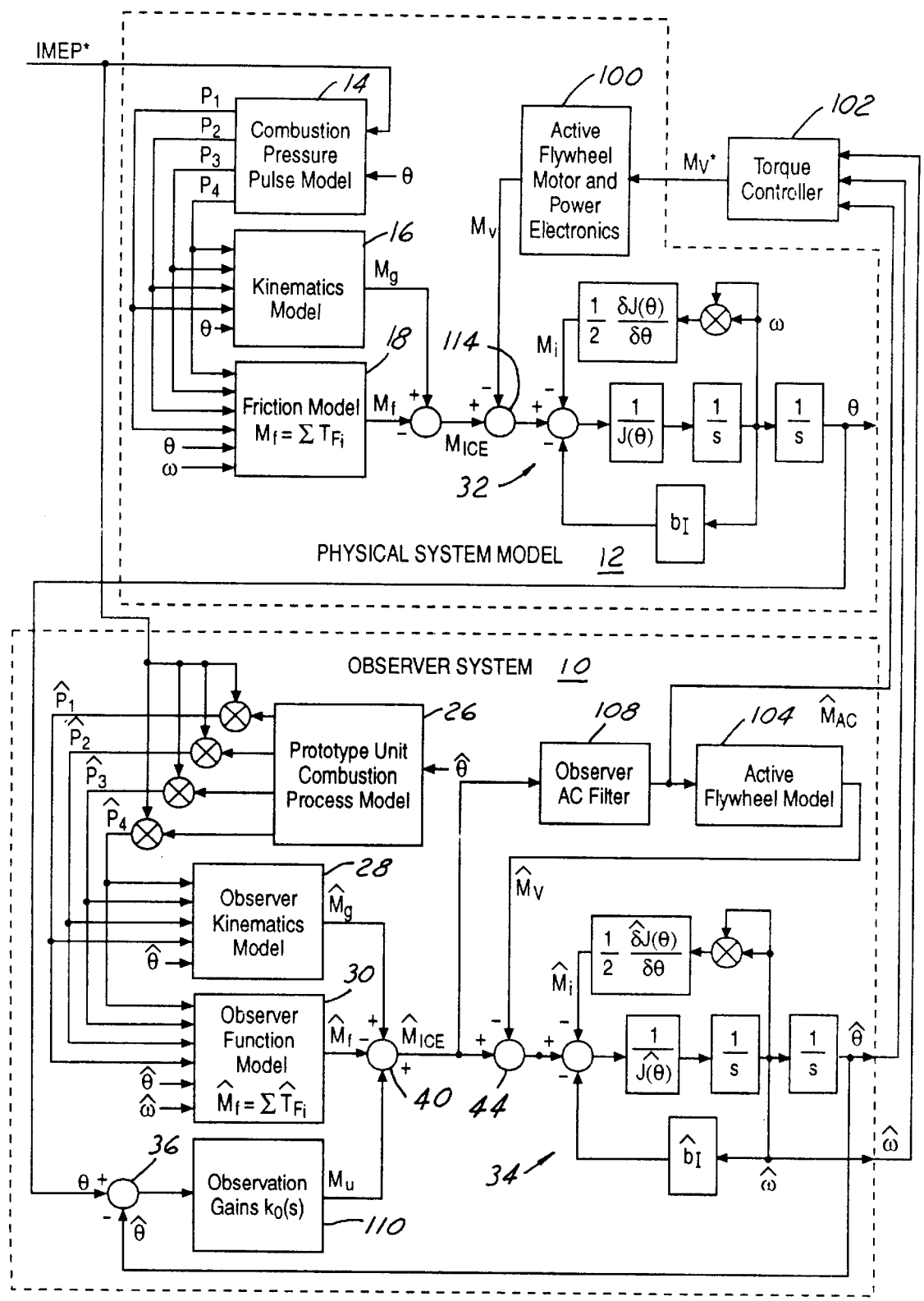
FIG. 1 is a schematic block diagram of an example of a crankshaft torque observer shown in association with an engine pursuant to principles of the present invention.

FIG. 1 shows an exemplary embodiment comprising an observer system 10 in functional association with a model of a physical system 12. The physical system comprises an automotive vehicle internal combustion engine whose estimated torque output $M_{ICE}$ is a function of variables, including: a model of a combustion process 14 that occurs within the engine; a kinematics model 16 inherent in the mechanical design of the engine; and a model of running friction 18. A variable signal IMEP* that represents the value of instantaneous engine power demand and that is typically available from an on-board microprocessor-based engine controller, is an input to combustion process model 14. IMEP* is an input that, for a given engine design, determines pressures $P_1$, $P_2$, $P_3$, $P_4$ in individual combustion chambers of the engine as the engine operates, the particular embodiment portrayed by this example being a four-cylinder engine. Because the volumes of the combustion chambers are continuously changing as the engine operates, engine crankshaft position $\theta$ is also an input to the combustion process model.

Pressures $P_1$, $P_2$, $P_3$, $P_4$ act on the crankshaft through piston-connecting rod combinations that are modeled by kinematics model 16. Because the geometries of these crank mechanisms for converting combustion chamber pressures into crankshaft torque are continuously changing as the crankshaft rotates, kinematics 16 is also a function of engine crankshaft position θ. Ultimately, combustion process 14 yields a positive gas pressure torque contribution $M_g$ to the estimated torque output $M_{ICE}$.

Estimated torque output $M_{ICE}$ is equal to the positive torque contribution $M_g$ from combustion minus torque lost due to running friction $M_f$. The lost torque $M_f$ is a function of combustion pressures $P_1$, $P_2$, $P_3$, $P_4$, crankshaft position θ and engine speed ω, and hence both of those variables are also inputs to running friction model 18.

FIG. 1 incorporates several mathematical blocks, collectively designated by the general reference numeral 32, showing the effect of an arbitrary load $b_I$ on physical system 12, and of the varying, crankangle-dependent moment of inertia of the engine slider-crank mechanism, $J(\theta)$. The crankshaft position output θ may be obtained from any crankshaft position signal source of suitable angular resolution, one degree resolution being a satisfactory example.

The varying, crankangle-dependent engine inertia is computed using the equation $$J(\theta) = \left\{2m_{rec}r^2 + \frac{m_{rec}r^4}{2L^2}\right\} - 2m_{rec}r^2\cos(2\theta) - \frac{m_{rec}r^4}{2L^2}\cos(4\theta)$$

wherein $m_{rec}$ is the reciprocating portion of the piston and connecting rod masses, r is the crank radius, and L is the length of the connecting rod.

Because of the variation in inertia, an additional torque component is created which is proportional to the product of the square of the engine rotational speed and the partial derivative of the inertia expression above. This partial derivative is found to be $$\frac{\partial J(\theta)}{\partial \theta} = 4m_{rec}r^2\sin(2\theta) + \frac{2m_{rec}r^4}{L^2}\sin(4\theta)$$

Inclusion of these crankangle-dependent terms in the physical system model 12, and in the corresponding observer system 10, as represented by the collective blocks 32 and 34 respectively, effects a significant improvement in accuracy of the dynamics of the model and observer.

A dynamoelectric machine, i.e. a starter-alternator, is arranged to interact with the engine crankshaft in any suitable manner, and one that has a point of interaction with the engine at the engine crankshaft is believed to represent a configuration that provides most favorable interaction.

At any instant of time the starter-alternator is supplying torque $M_v$, that may have: 1) a non-zero value that is additive to the engine estimated torque output $M_{ICE}$; 2) a non-zero value that is subtractive from the engine estimated torque output $M_{ICE}$; or 3) a zero value. The block numbered 100 in FIG. 1 designates the dynamoelectric machine and associated power electronics, and it is labeled as Active Flywheel Motor and Power Electronics because that is a name sometimes given to such a dynamoelectric machine and associated electronics. The value of $M_v$ will therefore correspond substantially to the value of a signal $M_v^*$ from a torque controller 102 that is under the control of observer system 10, as will be more fully explained hereinafter.

Observer system 10 is created by modeling elements corresponding to combustion process 14, kinematics 16, and running friction 18. Hence, observer system 10 comprises blocks 26, 28, and 30 corresponding to blocks 14, 16, and 18. Block 26 develops values of modeled, or estimated, combustion pressures $P_1$hat, $P_2$hat, $P_3$hat, and $P_4$hat in the combustion chambers of the respective engine cylinders. The values $P_1$hat, $P_2$hat, $P_3$hat, $P_4$hat are inputs to kinematics model 28 and running friction model 30, and are processed by the respective models 28, 30 to develop respective values of modeled, or estimated, positive torque contribution $M_g$hat and of modeled, or estimated, torque $M_f$hat lost due to running friction $M_f$.

Observer system 10 incorporates a model, 34 generally, corresponding to the collective blocks 32 of physical system 12, and an active flywheel model 104 corresponding to block 100 of physical system 10. Model 34 develops estimated crankshaft speed and position signals (ωhat and θhat, respectively. Observer system 10 provides a modeled estimated torque output $M_{ICE}$hat that is equal to the modeled positive torque contribution $M_g$hat minus the modeled torque lost due to running friction $M_f$hat.

For extracting a ripple torque signal that has substantially zero mean value from estimated torque output $M_{ICE}$hat, observer system 10 comprises an AC filter 108 that develops an estimated ripple torque signal $M_{AC}$hat. This estimated ripple torque signal forms an input both to active flywheel model 104 in observer system 10 and to torque controller 102. Because of complexity of involved nonlinearities, a particular design of a reasonably appropriate filter 108 may be premised on an assumption that the engine is idling. Therefore assuming such an operating state, one can make the system substantially linear by treating the crankangle varying engine inertia torque as a separate input that is lumped with $M_{ICE}$. Such treatment results in an average, constant engine inertia, allowing linear analysis. A further assumption is also made, namely that the block 104, over a frequency range of interest, produces the desired torque perfectly, and therefore acts as a unity gain block.

The load on the engine, while idling, is mathematically modeled as a linear function, and a like function is incorporated in observer system 10. Block 110 represents a function that models response of observer system 10 in forcing convergence of estimated crankangle to measured crankangle. The effect of the observer system gain is also taken into account by that model. The function may be suitably represented by a PID (proportional, integral derivative) function with appropriate values for constants of each of the three terms. For securing correspondence of the operation of observer system 10 to the running of the engine of physical system 12, the crankshaft position signal from the physical system is input to a summing junction 36 of observer system 10 where the modeled crankshaft position signal θhat is subtracted to create an error signal that is input to block 110 and processed to create a signal $M_u$ that is algebraically summed with signals $M_g$hat and $M_f$hat at a summing junction 40. Selection of observer gains (i.e. the constants for the proportional, integral, and derivative terms) is made by evaluating the desired closed loop observer frequency response characteristics. In this way, operation of observer system 10 is forced to closely track the operation of the physical system by means of the closed-loop feedback of the estimated state θhat.

The signal $M_{AC}$hat represents a feedforward input to torque controller 102 for causing the starter/alternator to deliver, in real time, ripple cancellation torque $M_v$ that is substantially the opposite of whatever torque ripple is present in the crankshaft torque. The torque command $M_v^*$ from torque controller is made equal to the negative of $M_{AC}$hat to destructively interfere with the ripple component of engine torque. The ripple cancellation torque $M_v$ is subtracted from crankshaft torque $M_{ICE}$ at a summing junction 114, and the resulting difference forms the input to the modeled load on the engine and moment of inertia of the engine slider-crank mechanism.

The signal $M_{AC}$hat is also an input to active flywheel model 104 which processes that input to develop signal $M_v$hat as an estimate of the ripple cancellation torque produced by the active flywheel motor. Observer system comprises a summing junction 44 where the estimated ripple cancellation torque is subtracted from the estimated crankshaft torque. The difference forms the input to the modeled engine load 5 and engine slider-crank mechanism moment of inertia in observer system 10. This processing of the signal $M_{AC}$hat is necessary to maintain close correspondence of the observer system with the physical system. Thus the observer accurately represents the behavior of the physical system.

Figure 2:
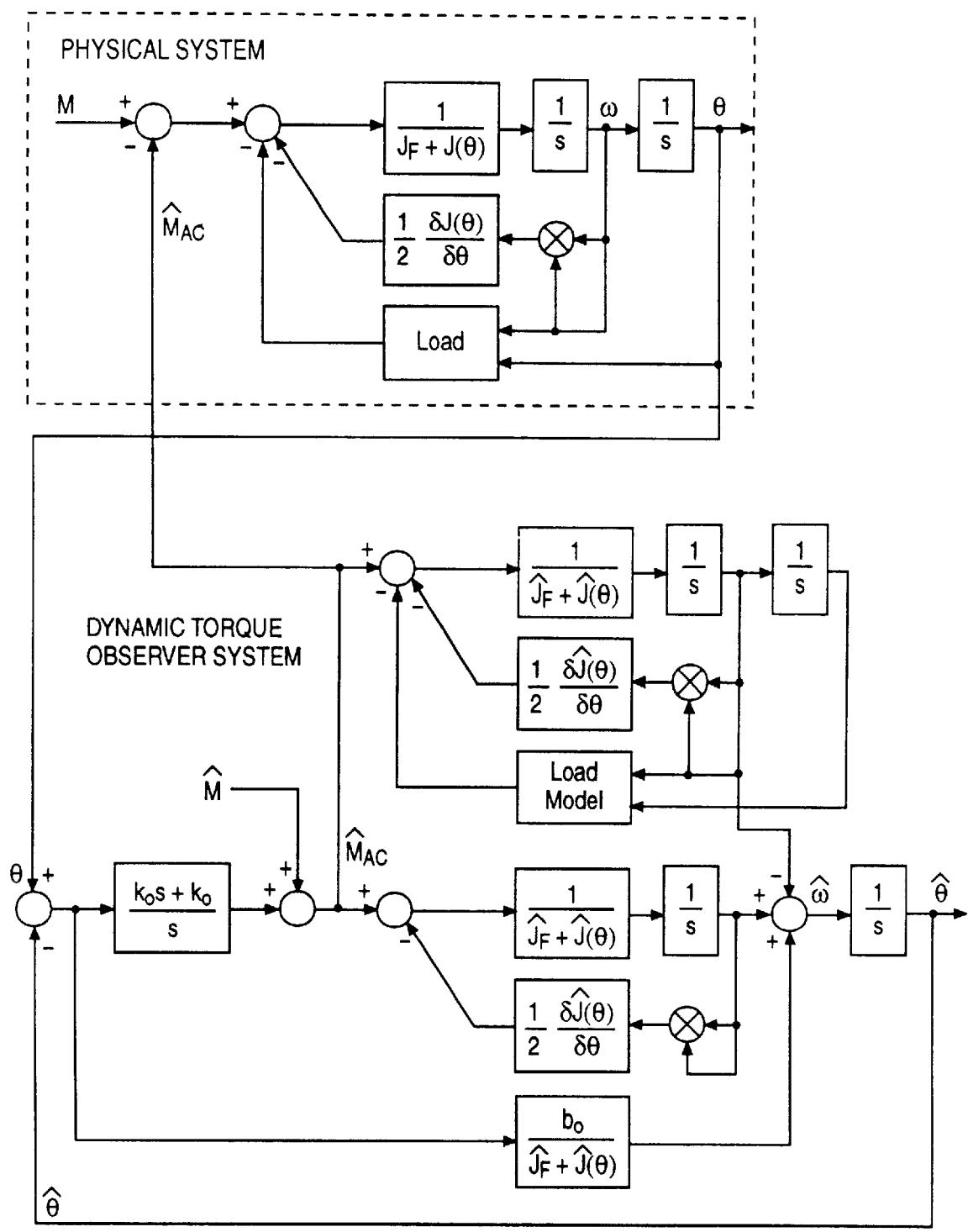
FIG. 2 is a schematic block diagram depicting a dynamic torque observer system associated with an engine.

FIG. 2 represents a simulation of the entire system including engine model, nonlinear observer, and controller. It accomplishes the objective of extracting only the zero mean value ripple content of crankshaft torque $M_{AC}$hat. The characteristics of the $M_{AC}$hat signal are controlled by the nature of the observer model and controller gains shown in the Figure. Proper selection of these gains is driven by the desire to drive the position error to zero with the desired transient response. This is accomplished by considering the eigenvalues of the characteristic equation of the open loop observer and selecting the controller gains appropriately to create the desired closed loop characteristic equation eigenvalues. That criteria, and the criteria of smoothly, but quickly, attenuating lower frequency components of $M_{AC}$hat, completely determine the selection of gains of block 110.

While a presently preferred embodiment has been illustrated and described, it is to be appreciated that the invention may be practiced in various forms within the scope of the following claims.

What is claimed is:

1. A control system for a powerplant that comprises a combustion engine including a rotating crankshaft that delivers output torque and a dynamoelectric machine arranged for interaction with the combustion engine to modify the output torque delivered by the crankshaft, the control system comprising:

a processor for developing data for controlling the combustion engine and the dynamoelectric machine, including an observer for developing observed data that comprises estimated engine output torque represented as an estimated average value torque component on which is superimposed an estimated alternating polarity ripple torque component whose mean value over a time interval of interest is substantially zero;

the observer comprising an engine model that models operation of the engine and a filter model developing the estimated alternating polarity ripple torque component from the estimated engine output torque, and a dynamoelectric machine model modeling the dynamoelectric machine;

the processor operating to process data through the engine model to develop estimated torque contribution due to engine operation;

the processor further operating to process data through the filter model to develop the estimated alternating polarity ripple torque component, to process the estimated alternating polarity ripple torque component through the dynamoelectric machine model to develop estimated dynamoelectric machine torque output, and to develop, from the estimated alternating polarity ripple torque component, dynamoelectric machine torque data representing torque that the dynamoelectric machine is commanded to deliver to substantially cancel, from output torque delivered by the crankshaft, the engine-induced ripple torque, resulting in crankshaft torque that has substantially zero mean value RMS dynamic content over a time interval of interest.

2. A control system as set forth in claim 1 in which the engine model models both positive and negative torque contributions to engine operation.

3. A control system as set forth in claim 2 in which the observer model of operation of the engine comprises both estimated engine speed and estimated crankangle.

4. A control system as set forth in claim 3 in which the observer comprises a closed loop controller that processes estimated engine speed and estimated crankangle to develop crankangle convergence.

5. A hybrid electric vehicle comprising:

a combustion engine for propelling the vehicle via a drivetrain of the vehicle and comprising a slider-crank mechanism including a rotating crankshaft that delivers output torque to a load;

a dynamoelectric machine arranged for interaction with the combustion engine to modify the output torque delivered by the crankshaft;

a control system comprising a processor for developing data controlling the combustion engine and the dynamoelectric machine, including an observer for developing observed data that comprises estimated engine speed, estimated crankangle, and estimated engine output torque represented as an estimated average value torque component on which is superimposed an estimated alternating polarity ripple torque component whose mean value over a time interval of interest is substantially zero;

the observer comprising a combustion process model developing modeled pressure estimates of combustion chamber pressures in engine cylinders according to data that influences combustion chamber pressures, a kinematics model relating reciprocal motion of pistons in the engine cylinders to engine crankshaft rotation, an engine friction model relating running friction of the engine to engine crankshaft rotation, an observer closed loop controller to force convergence of estimated crankangle to measured crankangle, a filter model developing the estimated alternating polarity ripple torque component from the estimated engine output torque, a dynamoelectric machine model modeling the dynamoelectric machine, an engine load model modeling load on the engine crankshaft, and a moment of inertia model modeling moment of inertia of the slider-crank mechanism of the engine as a function of crankangle;

the processor operating to process data through the combustion process model to develop the modeled pressure estimates, to process estimated crankangle and the modeled pressure estimates through the kinematics model to develop estimated positive torque contribution due to combustion processes, to process the modeled pressure estimates, the estimated crankangle, and the estimated engine speed through the engine friction model to develop estimated torque loss due to engine running friction, and to process the estimated positive torque contribution due to combustion processes and the estimated torque loss due to engine running friction to develop the estimated engine torque output;

the processor further operating to process the measured crankangle and the estimated crankangle through the observer closed loop controller to develop crankangle convergence data, to process the estimated engine torque output and the crankangle convergence data through the filter model to develop the estimated alternating polarity ripple torque component, and to process the estimated alternating polarity ripple torque component through the dynamoelectric machine model to develop estimated dynamoelectric machine torque output, to subtract the estimated dynamoelectric machine torque output from the estimated engine torque output and process that difference and the convergence data through the moment of inertia model to develop the estimated crankangle and the estimated engine speed;

and the processor further operating to process the estimated crankangle, the estimated engine speed, and the estimated alternating polarity ripple torque component to develop dynamoelectric machine torque data representing torque that the dynamoelectric machine is commanded to deliver to substantially cancel, from output torque delivered by the crankshaft, the engine-induced ripple torque, resulting in crankshaft torque that has substantially zero mean value RMS dynamic content over a time interval of interest.

6. A control system for a powerplant that comprises a combustion engine having a slider-crank mechanism including a rotating crankshaft that delivers output torque and a dynamoelectric machine arranged for interaction with the combustion engine to modify the output torque delivered by the crankshaft, the control system comprising:

a processor for developing data for controlling the combustion engine and the dynamoelectric machine, including an observer for developing observed data that comprises estimated engine speed, estimated crankangle, and estimated engine output torque represented as an estimated average value torque component on which is superimposed an estimated alternating polarity ripple torque component whose mean value over a time interval of interest is substantially zero;

the observer comprising a combustion process model developing modeled pressure estimates of combustion chamber pressures in engine cylinders according to data that influences combustion chamber pressures, a kinematics model relating reciprocal motion of pistons in the engine cylinders to engine crankshaft rotation, an engine friction model relating running friction of the engine to engine crankshaft rotation, an observer closed loop controller to force convergence of estimated crankangle to measured crankangle, a filter model developing the estimated alternating polarity ripple torque component from the estimated engine output torque, a dynamoelectric machine model modeling the dynamoelectric machine, an engine load model modeling load on the engine crankshaft, and a moment of inertia model modeling moment of inertia of the slider-crank mechanism of the engine as a function of crankangle;

the processor operating to process data through the combustion process model to develop the modeled pressure estimates, to process estimated crankangle and the modeled pressure estimates through the kinematics model to develop estimated positive torque contribution due to combustion processes, to process the modeled pressure estimates, the estimated crankangle, and the estimated engine speed through the engine friction model to develop estimated torque loss due to engine running friction, and to process the estimated positive torque contribution due to combustion processes and the estimated torque loss due to engine running friction to develop the estimated engine torque output;

the processor further operating to process the measured crankangle and the estimated crankangle through the observer closed loop controller to develop crankangle convergence data, to process the estimated engine torque output and the crankangle convergence data through the filter model to develop the estimated alternating polarity ripple torque component, and to process the estimated alternating polarity ripple torque component through the dynamoelectric machine model to develop estimated dynamoelectric machine torque output, to subtract the estimated dynamoelectric machine torque output from the estimated engine torque output and process that difference and the convergence data through the moment of inertia model to develop the estimated crankangle and the estimated engine speed;

and the processor further operating to process the estimated crankangle, the estimated engine speed, and the estimated alternating polarity ripple torque component to develop dynamoelectric machine torque data representing torque that the dynamoelectric machine is commanded to deliver to substantially cancel, from output torque delivered by the crankshaft, the engine-induced ripple torque, resulting in crankshaft torque that has substantially zero mean value RMS dynamic content over a time interval of interest.

7. A method of controlling a dynamoelectric machine to substantially cancel substantially zero mean value ripple torque induced in a crankshaft of a combustion engine by combustion events that are effective on the crankshaft through a slider-crank mechanism, the method comprising:

processing data through an observer to develop observed data that comprises estimated engine speed, estimated crankangle, and estimated engine output torque represented as an estimated average value torque component on which is superimposed an estimated alternating polarity ripple torque component whose mean value over a time interval of interest is substantially zero;

processing data through a combustion process model in the observer to develop modeled pressure estimates of combustion chamber pressures in engine cylinders according to data that influences combustion chamber pressures;

processing estimated crankangle and the modeled pressure estimates through a kinematics model in the observer relating reciprocal motion of pistons in the engine cylinders to engine crankshaft rotation to develop estimated positive torque contribution due to combustion processes;

processing the modeled pressure estimates, the estimated crankangle, and estimated engine speed through an engine friction model in the observer relating running friction of the engine to engine crankshaft rotation to develop estimated torque loss due to engine running friction;

processing, in the observer, the estimated positive torque contribution due to combustion processes and the estimated torque loss due to engine running friction to develop estimated engine torque output;

processing the measured crankangle and the estimated crankangle through an observer closed loop controller to force convergence of estimated crankangle to measured crankangle to develop crankangle convergence data;

processing the estimated engine torque output and the crankangle convergence data through a filter model in the observer for developing the estimated alternating polarity ripple torque component to develop the estimated alternating polarity ripple torque component from the estimated engine output torque;

processing the estimated alternating polarity ripple torque component through a dynamoelectric machine model in the observer modeling the dynamoelectric machine to develop estimated dynamoelectric machine torque output;

subtracting the estimated dynamoelectric machine torque output from the estimated engine torque output and processing that difference and the convergence data through an engine load model in the observer modeling load on the engine crankshaft and a moment of inertia model in the observer modeling moment of inertia of the slider-crank mechanism as a function of crankangle to develop the estimated crankangle and the estimated engine speed; and processing the estimated crankangle, the estimated engine speed, and the estimated alternating polarity ripple torque component to develop dynamoelectric machine torque data representing torque that the dynamoelectric machine is commanded to deliver to substantially cancel, from output torque delivered by the crankshaft, the engine-induced ripple torque, resulting in crankshaft torque that has substantially zero mean value RMS dynamic content over a time interval of interest.

* * * * *